(12) United States Patent
Tolvanen et al.

(10) Patent No.: US 9,916,244 B1
(45) Date of Patent: Mar. 13, 2018

(54) TECHNIQUES FOR MAINTAINING CACHE COHERENCE BY ATOMICALLY PROCESSING GROUPS OF STORAGE COMMANDS

(71) Applicant: EMC IP Holding Company LLC, Hopkinton, MA (US)

(72) Inventors: Peter E. Tolvanen, Mendon, MA (US); Henry Austin Spang, IV, Hopkinton, MA (US); Gregory S. Schaffer, Berlin, MA (US); Philippe Armangau, Acton, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/282,209

(22) Filed: Sep. 30, 2016

(51) Int. Cl.
| | |
|---|---|
| *G06F 12/08* | (2016.01) |
| *G06F 3/06* | (2006.01) |
| *G06F 12/12* | (2016.01) |
| *G06F 12/0808* | (2016.01) |
| *G06F 12/128* | (2016.01) |

(52) U.S. Cl.
CPC .......... *G06F 12/0808* (2013.01); *G06F 3/065* (2013.01); *G06F 3/0619* (2013.01); *G06F 3/0659* (2013.01); *G06F 3/0689* (2013.01); *G06F 12/128* (2013.01); *G06F 2212/621* (2013.01); *G06F 2212/69* (2013.01)

(58) Field of Classification Search
CPC ...... G06F 3/0619; G06F 3/0659; G06F 3/065; G06F 3/0689; G06F 3/061; G06F 3/0604; G06F 2212/621; G06F 2212/69; G06F 12/0806; G06F 3/0641; G06F 2212/283; G06F 12/0808; G06F 12/0828
See application file for complete search history.

(56) References Cited

U.S. PATENT DOCUMENTS

| | | | |
|---|---|---|---|
| 6,523,102 B1* | 2/2003 | Dye | G06F 12/023 709/247 |
| 8,429,362 B1* | 4/2013 | Natanzon | G06F 11/1471 711/161 |
| 2004/0236983 A1* | 11/2004 | Burton | G06F 11/2058 714/6.23 |
| 2005/0182906 A1* | 8/2005 | Chatterjee | G06F 11/201 711/144 |

* cited by examiner

*Primary Examiner* — Zhuo Li
(74) *Attorney, Agent, or Firm* — BrainwoodHuang (57) ABSTRACT

Improved techniques for maintaining cache coherence in a consistent state are provided. These techniques implement a data storage system using a journaled mirrored cache that ensures that storage operations making up certain transactions be performed atomically, so that a system failure does not result in data loss. The improved techniques also allow for efficient communication of mirroring information.

14 Claims, 7 Drawing Sheets

TECHNIQUES FOR MAINTAINING CACHE COHERENCE BY ATOMICALLY PROCESSING GROUPS OF STORAGE COMMANDS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems use a journaled mirrored cache that allows write commands to be acknowledged to the issuing host as soon as the command can be stored within cache and mirrored. This results in increased performance by reducing latency to hosts for write while maintaining the security of mirror-based persistence.

SUMMARY

Unfortunately, although use of a journaled mirrored cache increases performance while maintaining protection against failure of a single cache, this technique may suffer from deficiencies. For example, certain transactions undertaken by a journaled mirrored cache may pose a data loss risk if the mirroring is performed in the middle of the transaction and one of the caches fails.

When a host sends a write command to a logical disk on a data storage system, the data storage system may cache the write command and associated data in a data log in order to avoid delays associated with ensuring that the target address is properly provisioned as well as delays in creating snapshots based on a previous state of the logical disk,. This allows the data to be written to a circular buffer of the data log while a descriptor of what to do with the data is also stored elsewhere within the data log. To preserve coherence, the data and the descriptor should both be stored at the same time. Otherwise, if the system crashed between the writes, the data log would describe an inconsistent state of the system.

When the data in the data log is eventually to be written to the target logical disk, it is essential that the data blocks be moved at the same time that the data log descriptors for that data are invalidated. Otherwise, the data log would describe an inconsistent state of the system upon a crash.

Thus, in contrast with previous approaches, it would be desirable to implement a data storage system using a journaled mirrored cache that ensures that storage operations making up certain transactions be performed atomically, so that a system failure does not result in data loss. The improved techniques also allow for efficient communication of mirroring information.

One embodiment is directed to a method, performed by a data storage system (DSS), of maintaining cache coherence in a consistent state. The method includes (1) by a mapping driver running on a set of processing circuitry of the DSS, identifying a plurality of related storage operations that must be performed atomically to avoid incoherency within a log-based cache of the set of processing circuitry, the log-based cache of the set of processing circuitry being maintained by a mirrored cache driver (MCD) running on the set of processing circuitry, (2) in response to identifying the plurality of related data storage commands, generating, by the mapping driver, an inter-driver communication structure (IDCS), the IDCS including instructions to perform the plurality of storage commands in parallel, (3) sending the generated IDCS from the mapping driver to the MCD running on the set of processing circuitry, (4) in response to the MCD receiving the IDCS from the mapping driver, provisionally executing, by the MCD, each of the plurality of storage commands as directed by the ICDS, resulting in a set of provisional changes to the log-based cache of the set of processing circuitry as maintained by the MCD, and (5) in response to successfully completing provisionally executing all of the plurality of storage commands, committing, by the MCD, the set of provisional changes to the log-based cache of the set of processing circuitry. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Improved techniques for maintaining cache coherence in a consistent state are provided. These techniques implement a data storage system using a journaled mirrored cache that ensures that storage operations making up certain transactions be performed atomically, so that a system failure does not result in data loss. The improved techniques also allow for efficient communication of mirroring information.

Figure 1:
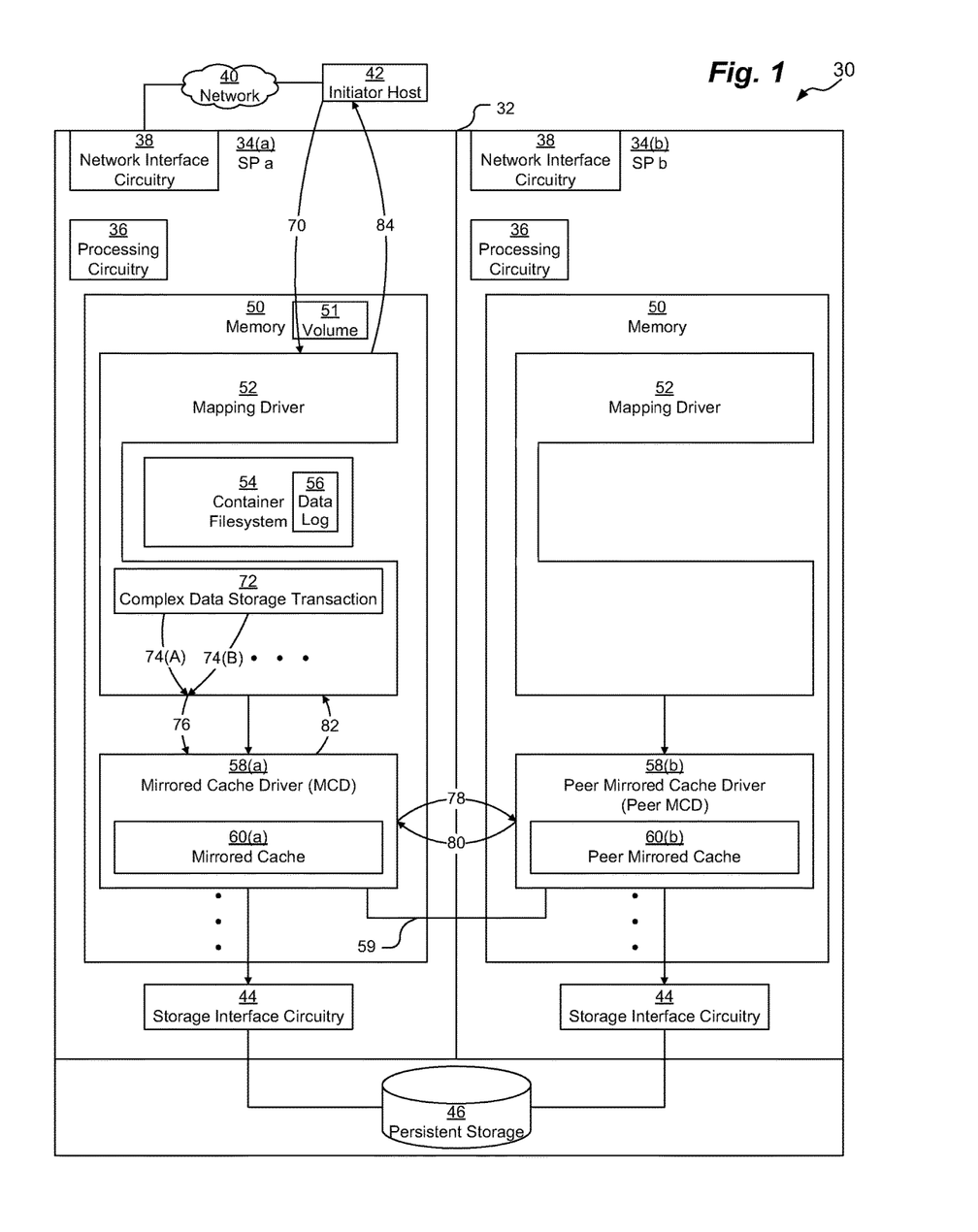
FIG. 1 is a block diagram depicting a logical view of an example system and apparatus according to various embodiments.

FIG. 1 shows an example environment 30 in which embodiments of the improved techniques hereof can be practiced. Here, one or more initiator host computing devices ("hosts") 42 access a data storage system (DSS) 32 over a network 40. The DSS 32 includes a set of two storage processors (SPs) 34(a), 34(b) connected to persistent storage 46 of the DSS. Each SP 34 includes processing circuitry 36, network interface circuitry 38, memory 50, storage interface circuitry 44, and interconnection circuitry (not depicted).

Persistent storage 46 may include one or more of any kind of storage device (not depicted) able to persistently store data, such as, for example, a magnetic hard disk drive, a solid state storage device (SSD), etc. As depicted, persistent storage 46 is arranged as a plurality of RAID groups (not depicted). Each RAID group is made up of one or more storage devices, which may logically combine to create a logical disk having larger size or redundancy features or both, depending on the RAID level, as is well-known in the art. Each RAID group may be partitioned into one or more volumes (not depicted), which may be further partitioned into a plurality of slices (not depicted), typically 256 megabytes or 1 gigabyte in size, for example. Slices from one or more RAID groups may be logically combined to create volumes that support one or more container filesystem 54, which, in turn, support volume files that provide one or more host-accessible volume 51.

Storage interface circuitry 44 controls and provides access to persistent storage 46. Storage interface circuitry 44 may include, for example, SCSI, SAS, ATA, SATA, Fibre Channel (FC), and/or other similar controllers and ports as well as a RAID controller, etc. Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

The network 40 may be any type of network or combination of networks, such as a storage area network (SAN), a local area network (LAN), a wide area network (WAN), the Internet, and/or some other type of network or combination of networks, for example. The host 42 may connect to the DSS 32 using various technologies, such as Fibre Channel, iSCSI, NFS, SMB 3.0, and CIFS, for example. Any number of hosts 42 may be provided, using any of the above protocols, some subset thereof, or other protocols besides those shown.

Network interface circuitry 38 may include one or more Ethernet cards, cellular modems, Fibre Channel (FC) adapters, Wireless Fidelity (Wi-Fi) wireless networking adapters, and other devices for connecting to a network 40, such as a SAN, local area network (LAN), wide area network (WAN), cellular data network, etc. Network interface circuitry 38 is able to communicate with host 42 over network 40.

A host 42 may be any kind of computing device configured to operate on a network, such as, for example, personal computers, workstations, server computers, enterprise servers, laptop computers, tablet computers, smart phones, mobile computers, etc. or combinations thereof. Typically, a host 42 is a server computer or an enterprise server.

In an example, the SPs 34(a), 34(b) of the DSS 32 are configured to receive I/O requests and to respond to such I/O requests by reading or writing to the persistent storage 46.

Each SP 34(a), 34(b) may be provided as a circuit board assembly, or "blade," which plug into a chassis of DSS 32, which encloses and cools the SPs 34. The chassis has a backplane for interconnecting the SPs 34, and additional connections may be made among SPs 34 using cables. It is understood, however, that no particular hardware configuration is required, as any number of SPs 34, including a single SP 34, may be provided and the SP 34 can be any type of computing device capable of processing host I/Os.

The memory 50 may include both volatile memory (e.g., random access memory, RAM), and non-volatile memory, such as one or more read-only memories (ROMs), disk drives, solid-state drives, and the like. At a minimum, memory 50 includes system memory, typically RAM. The processing circuitry 36 and the memory 50 together form control circuitry, which is constructed and arranged to carry out various methods and functions as described herein, e.g., alone or in coordination with similar control circuitry on another data storage system. Also, the memory 50 includes a variety of software constructs realized in the form of executable instructions. When the executable instructions are run by the processing circuitry 36, the processing circuitry 36 is caused to carry out the operations of the software constructs. Although certain software constructs are specifically shown and described, it is understood that the memory 50 typically includes many other software constructs, which are not shown, such as an operating system, various applications, processes, and daemons. Applications configured to run on processing circuitry 36 when stored in non-transitory form, either in the volatile portion or the non-volatile portion of memory 50 or both, form a computer program product. The processing circuitry 36 running one or more of these applications thus forms a specialized circuit constructed and arranged to carry out the various processes described herein.

Memory 50 on SP 34(a) includes a driver stack of that includes various drivers, including mapping driver 52, mirrored cache driver 58(a), and other low-level storage drivers (not depicted) for interfacing with storage interface circuitry 44. The drivers in the driver stack together realize various logical storage structures, such as, for example, a container filesystem 54 and a host-facing volume 51.

Mapping driver 52 may be a multi-part driver having an upper arm and a lower arm as shown. In addition, mapping driver 52 is arranged in a "C-Clamp" configuration, allowing it to communicate with various other software modules without using inter-driver communication. Thus, mapping driver 52 is able to directly communicate with container filesystem 54. Container filesystem 54 is logical representation of a filesystem that is backed by slices provided by persistent storage 46.

Some addresses within container filesystem 54 may be cached within mirrored cache 60(a), allowing for fast access to those portions. While backed by the mirrored cache 60(a), blocks of the container filesystem 54 may be said to be "dirty" if the version of data in those blocks is newer than the versions actually stored within the backing of persistent storage 46. Some portions of the container filesystem 54 are so important from a performance perspective (e.g., data log 56), that these portions may be continually backed by the mirrored cache 60(a), only flushing to physical backing on persistent storage 46 under unusual circumstances. Data log 56, which is generally cached in mirrored cache 60(a), stores incoming writes in a journaled manner to improve performance.

Mirrored cache driver (MCD) 58(a) is a driver that transparently provides access to backing within the persistent storage 46 in such a manner that mapping driver 52 is often not aware whether any given block of container filesystem 54 is currently backed by a cache page within mirrored cache 60(a) in a dirty manner or whether the persistent storage 46 currently accurately represents that block. Typically, while being accessed by the mapping driver, any given block of the container filesystem 54 is at least temporarily cached as a page within mirrored cache 60(a).

Mirrored cache 60(a) may be made up of any form of memory, but, in some embodiments, it is made up of high-speed memory. In other embodiments, it is wholly or partly made up of battery-backed memory or non-volatile memory for fault tolerance purposes.

MCD 58(a) communicates with a peer MCD 58(b) that operates similarly to MCD 58(a) but on the other SP 34(b). This communication takes place over a high-speed inter-processor bus or interconnect 59. This high-speed bus 59 allows the entire contents of mirrored cache 60(*a*) to be mirrored on the peer mirrored cache 60(*b*). In this manner, even though the mirrored cache 60(*a*) contains dirty pages that are not yet flushed to persistent storage, there is protection against failure of the SP 34(*a*) because a backup copy exists within peer mirrored cache 60(*b*) on SP 34(*b*).

In operation, host 42 sends a write command 70 to host-facing volume 51. Mapping driver 52 attempts to place this write command within container filesystem 54, which backs the volume 51. However, in order to provide fast operation, mapping driver 52 sends the write command 70 to be journaled within data log 56. Since data log 56 is part of container filesystem 54, but container filesystem 54 is not actually located within mapping driver (but it just appears to be there in a logical sense), mapping driver 52 actually needs to communicate with MCD 58(*a*) to store the data. Mapping driver 52 effectively is trying to perform a complex data storage transaction 72 (e.g., journaling write command 70 within data log 56). This complex data storage transaction 72 may conceptually be broken down into a series of operations 74 (depicted as operations 74(A), 74(B), . . . ), which should be performed atomically. That is, all of these operations 74 should complete successfully together to avoid data corruption. In some embodiments, the complex data storage transaction 72 may also be made up of additional operations (not depicted) that need not be complete atomically with operations 74. In order to ensure that MCD 58(*a*) performs these operations 74 atomically, mapping driver 52 groups these operations 74 into a single inter-driver communication structure (IDCS) 76, which it then sends down the driver stack to MCD 58(*a*). An IDCS 76 is a type of structure used to communicate between drivers, as is known in the art. An IDCS 76 may be, for example, an IOCTL or an I/O Request Packet (IRP) as known in the art. However, the specific IDCS 76 as depicted is a special ICDS 76 that allows several operations 74 to be grouped together for atomic fulfillment.

Although described as relating to a write command 70 received from a host 42, the complex data storage transaction 72 may take other forms. For example, the complex data storage transaction 72 may instead, for example, be an attempt to flush a journaled write command from the data log 56 into its proper place within container filesystem 54.

Upon receiving the IDCS 76, MCD 58(*a*) processes all of the individual operations 74 that were grouped together for atomic execution, and only commits the changes once all operations complete successfully. In some embodiments, commitment is further delayed until a description 78 of the changes made to all pages within mirrored cache 60(*a*) can be sent across inter-processor bus 59 to the peer MCD 58(*b*) running on SP 34(*b*), the peer MCD 58(*b*) executes those changes, and the peer MCD 58(*b*) sends back a confirmation signal 78 indicating successful harmonization. At that point, the changes can be committed, and an acknowledgment 82 can be returned to the mapping driver 52. In the case of a write command 70 from host 42, mapping driver 52 can now send an acknowledgment 84 back to the host 42 even though the data has not yet been written to persistent storage 46. In some embodiments, if, instead of receiving the confirmation signal 78 from peer MCD 58(*b*), MCD 58(*a*) becomes aware (e.g., through the lack of a heartbeat signal) that the peer SP 34(*b*) has crashed or lost contact, then the SP 34(*a*) enters a non-mirrored mode, allowing the SP 34(*a*) to immediately commit the changes made to the mirrored cache 60(*a*), although in that situation the data log 56 may be flushed to persistent storage for safety.

It should be understood that each SP 34(*a*), 34(*b*) typically functions as a primary SP 34 for a given volume 51 (the other SP 34 functioning as the peer). Thus, each SP 34 may function in both a primary and a peer status, depending on the volume 51 being accessed.

Figure 2A:
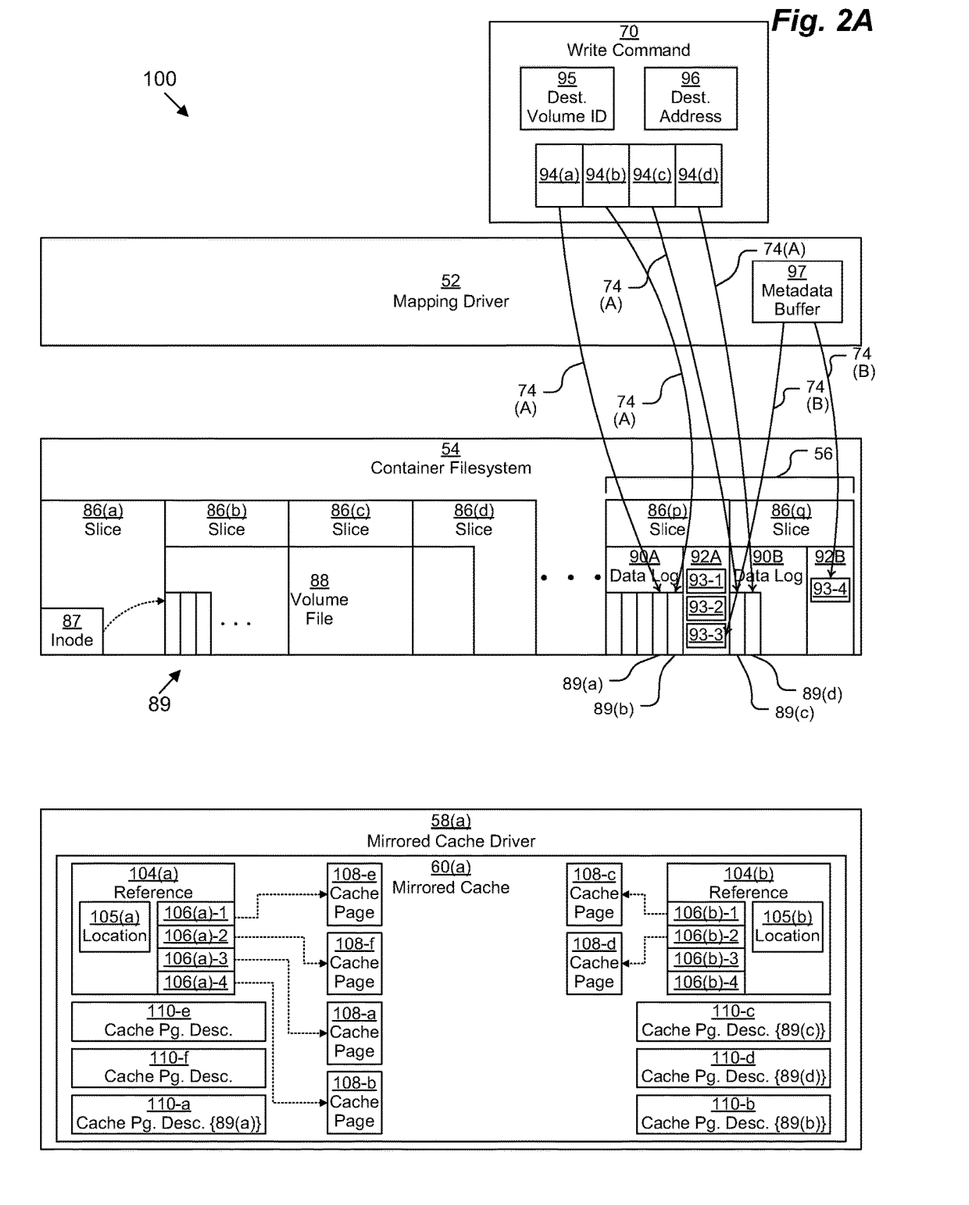
FIGS. 2A and 2B are block diagrams depicting example configurations of memory according to various embodiments.

FIG. 2A depicts an example portion 100 of memory 50 according to one embodiment. As depicted, a host 42 has issued a write command 70. The write command 70 includes or references four blocks 94 of data (depicted as blocks 94(*a*), 94(*b*), 94(*c*), 94(*d*)), a destination volume identifier 95, which identifies the volume 51 to which the command is directed, and a destination address 96. Destination address 96 may be, for example, a logical block address (LBA) within the volume 51.

Volume 51 is backed by a volume file 88 on the container filesystem 54. An inode 87 of the filesystem 87 defines the boundaries of the volume file 88, and the mapping driver 52 defines a mapping between blocks 89 of the volume file and blocks of the volume 51. The container filesystem 54 itself is provisioned with storage from slices 86 (depicted as slices 86(*a*), 86(*b*), 86(*c*), 86(*d*), . . . , 86(*p*), 86(*q*)).

Ultimately, the blocks 94 of the write command 70 are intended to be written to addresses of the volume 51 that are backed by blocks 89 of the volume file 88, which in turn are backed by slices 86. However, there is some complexity in defining the mapping between the blocks of the volume file 88 and the volume 52, in some cases requiring provisioning a new slice 86 to the container filesystem 54 and/or new blocks 89 to the volume file 88. Therefore, in order to speed up the latency in acknowledging the write command 70, mapping layer 52 initially does not actually execute the write command 70 into the desired locations within the volume file 88. Rather, mapping layer 52 causes the data of blocks 94(*a*), 94(*b*), 94(*c*), 94(*d*) of the write command 70 to be transferred to blocks 89(*a*), 89(*b*), 89(*c*), 89(*d*), respectively, within data log 56 of the container filesystem 54 and also causes metadata describing the write command 70 to be written to one or more log descriptor 93 of the data log 56.

In some embodiments, as depicted, data log 56 is arranged as two slices 86(*p*), 86(*q*) of the container filesystem 54. Although depicted at the end of the container filesystem 54, this is by way of example only—these two slices 86(*p*), 86(*q*) may actually be located at any address of the container filesystem 54. Although these slices 86(*p*), 86(*q*) are backed by persistent storage 46, data written to the data log 56 is typically always kept in a dirty state, never being flushed to persistent storage 46 except in case of a failure of an SP 34 or overprovisioning of available space within the mirrored cache 60(*a*).

Each slice 86(*p*), 86(*q*) of the data log is divided into two portions, a data log portion 90 (depicted as data log portion 90A for slice 86(*p*) and data log portion 90B for slice 86(*q*)) and a data log descriptor portion 92 (depicted as data log descriptor portion 92A for slice 86(*p*) and data log descriptor portion 92B for slice 86(*q*)). Together, data log portions 90A, 90B make up a ring buffer, which allows incoming blocks 94 to be copied to a current end of the ring buffer, wherever on data log portions 90A, 90B that currently is located. As blocks 89 of the data log portions 90A, 90B are written, a corresponding data log descriptor 93 within the data log descriptor portions 92 is also written with metadata about the write command 70.

As depicted, when the write command 70 was received, the end of the ring buffer was located just before the end of data log portion 90A. Thus, blocks 94(*a*), 94(*b*) are copied to blocks 89(*a*), 89(*b*), respectively at the end of data log portion 90A, and blocks 94(*c*), 94(*d*) are copied to blocks

89(*c*), 89(*d*), respectively at the beginning of data log portion 90B. Because the blocks 89(*a*), 89(*b*), 89(*c*), 89(*d*) from the write command 70 are divided between different data log portions 90A, 90B, two separate data log descriptors 93-3, 93-4 are used, one in each data log descriptor portion 92A, 92B. Thus, data log descriptor 93-3 indicates that blocks 89(*a*), 89(*b*) are meant to be written to two blocks starting at destination address 96 of volume 51, while data log descriptor 93-4 indicates that blocks 89(*c*), 89(*d*) are meant to be written to two blocks starting at destination address 96 plus two blocks of volume 51.

In operation, when mapping driver 52 receives the write command 70, it creates the metadata of the respective data log descriptors 93-3, 93-4 within metadata buffer 97, and it breaks a complex data storage transaction 72 (i.e., a transaction defined by the write command 70) into two component operations 74(A), 74(B), which it then passes on to MCD 58(*a*) within IDCS 76 (see FIG. 1).

Upon receiving the IDCS 76, MCD 58(*a*) executes operations 74(A), 74(B) atomically. It executes operation 74(A) by writing the data from blocks 94(*a*), 94(*b*), 94(*c*), 94(*d*) to blocks 89(*a*), 89(*b*), 89(*c*), 89(*d*), respectively. It should be noted, that this is done by transferring the data from host blocks 94(*a*), 94(*b*), 94(*c*), 94(*d*) to cache pages 108-*a*, 108-*b*, 108-*c*, 108-*d*, respectively, within mirrored cache 60(*a*) and writing a cache page descriptor 110 for each respective cache page 108 to keep track of where in the container filesystem 54 it belongs. Thus, cache page descriptor 110-*a* is associated with cache page 108-*a* and notes that it backs block 89(*a*) within slice 86(*p*). Similarly, cache page descriptor 110-*b* is associated with cache page 108-*b* and notes that it backs block 89(*b*) within slice 86(*p*). Similarly, cache page descriptor 110-*c* is associated with cache page 108-*c* and notes that it backs block 89(*c*) within slice 86(*q*). Similarly, cache page descriptor 110-*d* is associated with cache page 108-*d* and notes that it backs block 89(*d*) within slice 86(*q*).

In addition, MCD 58(*a*) also stores various references 104 to allow easy access to the blocks 89 on container filesystem 54. Each reference includes a location identifier 105, which identifies where its blocks 89 are located. In a typical embodiment, a reference 104 includes eight pointers 106, each pointer 106 pointing to an 8-kilobyte block 89 within a slice 86. Thus, each reference 104 aggregates one contiguous 64-kilobye segment of data within a slice 86, even if the component cache pages 108 (also typically 8-kilobytes in size) are not contiguous within mirrored cache 60(*a*). This is useful because it allows 64 kilobytes of data to be easily flushed to persistent storage 46 at once, which is more efficient than writing in small chunks. For simplicity of illustration, each reference 104 only includes four pointers 106 rather than eight. In the depiction, a segment is thus 32 kilobytes in size. Thus, for example, reference 104(*a*) represents the last 32-kilobyte segment of data log portion 90A on slice 86(*p*), as noted by its location identifier 105(*a*) identifying slice 86(*p*) and the appropriate offset within slice 86(*p*) that is four blocks prior to the end of data log portion 90A. Reference 104(*a*) contains four pointers 106(*a*)-1, 106(*a*)-2, 106(*a*)-3, 106(*a*)-4. Pointers 106(*a*)-3, 106(*a*)-4 represent blocks 89(*a*), 89(*b*), respectively. Thus, pointers 106(*a*)-3, 106(*a*)-4 point to cache pages 108-*a*, 108-*b*, respectively. As another example, reference 104(*b*) represents the first 32-kilobyte segment of data log portion 90B on slice 86(*q*), as noted by its location identifier 105(*b*) identifying slice 86(*q*) and offset zero within slice 86(*q*). Reference 104(*b*) contains four pointers 106(*b*)-1, 106(*b*)-2, 106(*b*)-3, 106(*b*)-4. Pointers 106(*b*)-1, 106(*b*)-2 represent blocks 89(*c*), 89(*d*), respectively. Thus, pointers 106(*b*)-1, 106(*b*)-2 point to cache pages 108-*c*, 108-*d*, respectively.

Upon receiving the IDCS 76, MCD 58(*a*) also executes operation 74(B) by copying data from metadata buffer 97 to data log descriptors 93-3, 93-4. In an embodiment, each data log descriptor 93 is 512 bytes long, there being several (i.e., sixteen) data log descriptors 93 within a given block 89 of data log descriptor portion 92 of a slice 86(*p*), 86(*q*) of the data log 56. It should be understood that MCD 58(*a*) performs operation 74(B) by caching the log descriptors 93-3, 93-4 within mirrored cache 60(*a*).

Figure 2B:
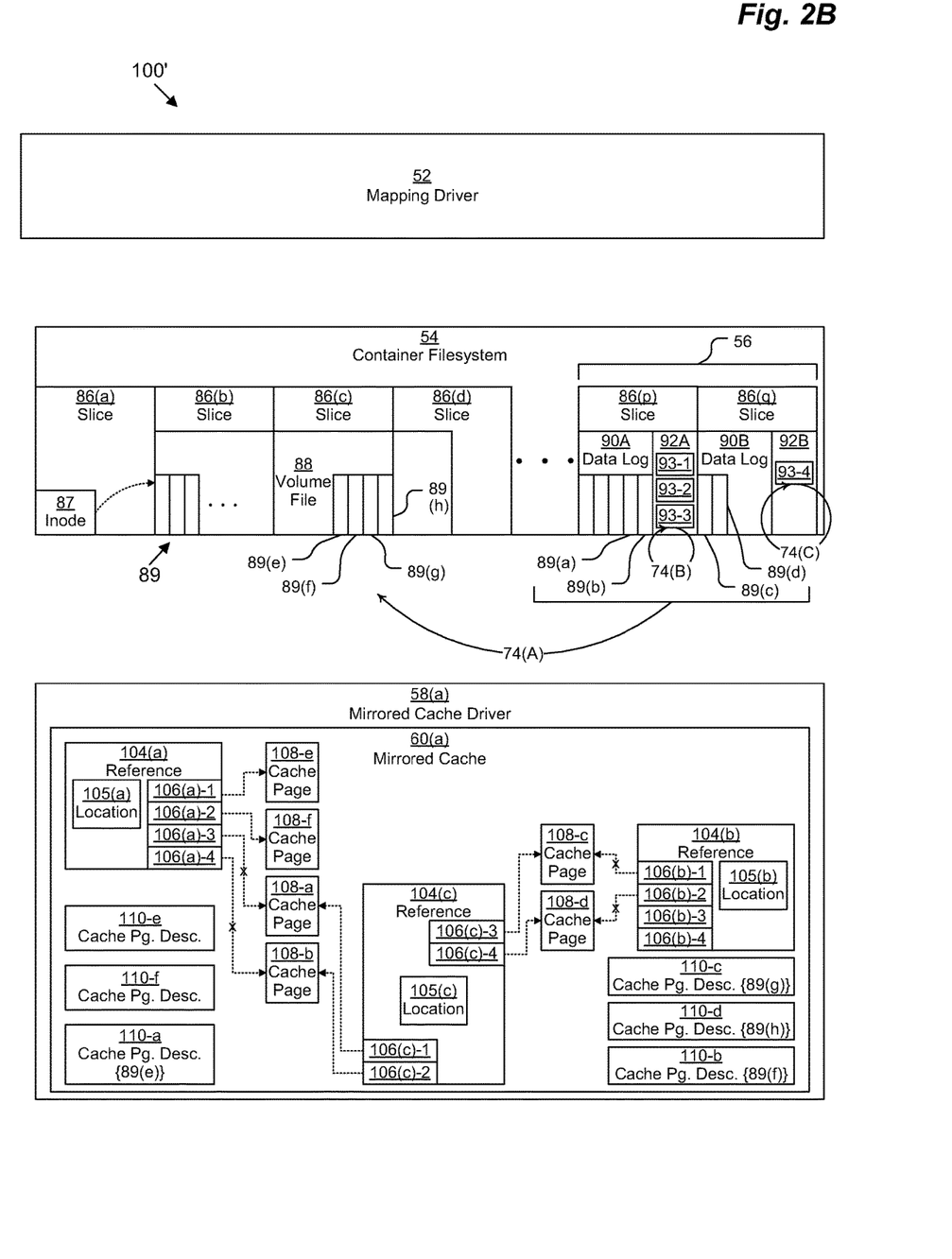

FIG. 2B depicts an example portion 100' of memory 50 according to another embodiment. As depicted, the state of portion 100' is initially the same as that of portion 100 in FIG. 2A after performing write command 70. However, mapping driver 52 now wants to move the data of blocks 89(*a*), 89(*b*), 89(*c*), 89(*d*) to their proper respective locations within volume file 88.

In operation, mapping driver 52 breaks up a complex data storage transaction 72 (i.e., a transaction defined by moving the data of blocks 89(*a*), 89(*b*), 89(*c*), 89(*d*) to their proper respective locations within volume file 88) into three component operations 74(A), 74(B), 74(C) which it then passes on to MCD 58(*a*) within IDCS 76 (see FIG. 1).

Upon receiving the IDCS 76, MCD 58(*a*) executes operations 74(A), 74(B), 74(C) atomically. MCD 58(*a*) executes operation 74(A) by renaming the cache pages 108-*a*, 108-*b*, 108-*c*, 108-*d* backing blocks 89(*a*), 89(*b*), 89(*c*), 89(*d*) to instead back blocks blocks 89(*e*), 89(*f*), 89(*g*), 89(*h*), respectively. The data does not actually need to be copied. Rather, the pointers 106(*a*)-3, 106(*a*)-4, 106(*b*)-1, and 106(*b*)-2 are erased (i.e., made NULL), and a new reference 104(*c*), representing the last segment of slice 86(*c*) (where, in this example, the blocks are to be backed within volume file 88), is created. MCD 58(*d*) then sets its pointers 106(*c*)-1, 106(*c*)-2, 106(*c*)-3, 106(*c*)-4 to point to cache pages 108-1, 108-2, 108-3, 108-4, respectively. The location identifier 105(*c*) of reference 104(*c*) is set to four blocks 89 prior to the end of slice 86(*c*). The corresponding cache page descriptors 110-*a*, 110-*b*, 110-*c*, 110-*d* are also updated to point to blocks 89(*e*), 89(*f*), 89(*g*), 89(*h*) of slice 86(*c*). Thus, blocks 89(*a*), 89(*b*), 89(*c*), 89(*d*) on slices 896(*p*), 86(*q*) have been effectively moved to slice 96(*c*), although their data has not been physically moved.

It is important, however, that data log descriptors 93-3, 93-4 be invalidated so that mapping driver 52 no longer thinks that the data in blocks 89(*a*), 89(*b*), 89(*c*), 89(*d*) remains to be copied into volume file 88. Therefore, upon receiving the IDCS 76, MCD 58(*a*) also executes operation 74(B) by either invalidating or zeroing segment 93-3. Upon receiving the IDCS 76, MCD 58(*a*) also executes operation 74(C) by either invalidating or zeroing segment 93-4.

It is important that all three operations 74(A), 74(B), 74(C) be performed atomically because otherwise the state of the volume 51 will be inconsistent.

Figure 3A:
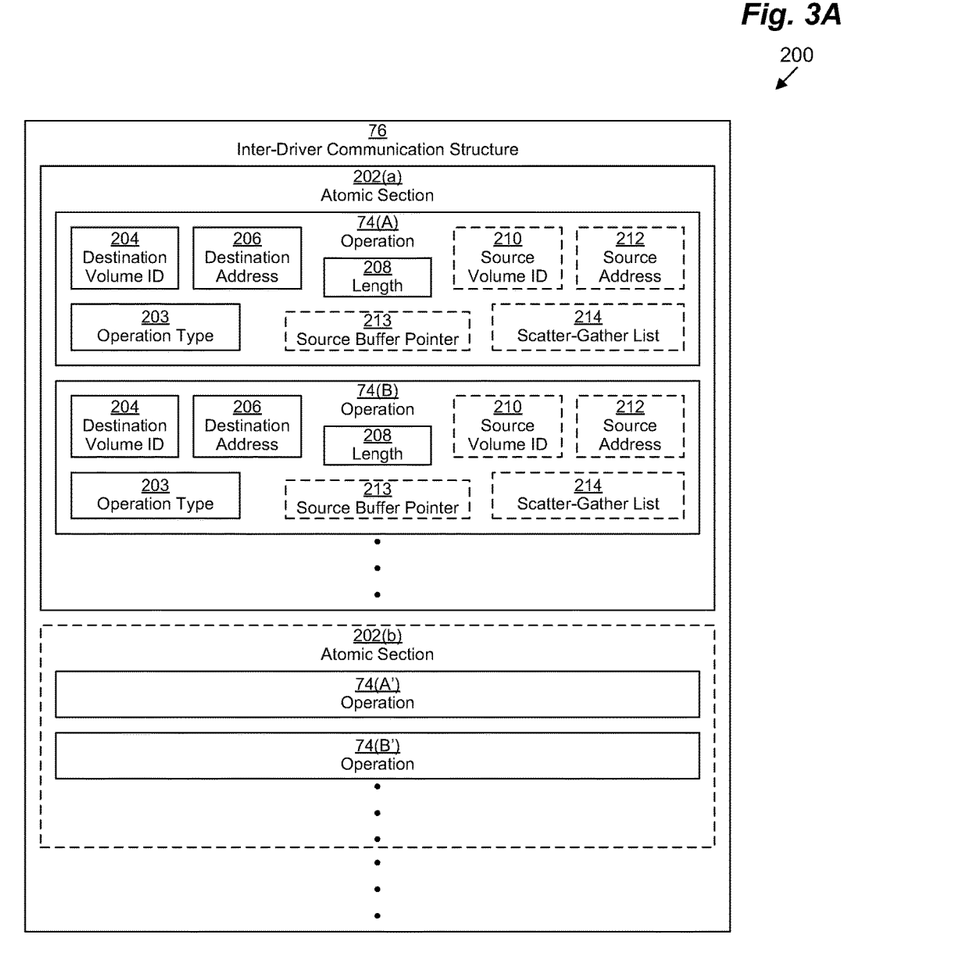
FIGS. 3A and 3B are block diagrams depicting example data structures used in connection with various embodiments.

FIG. 3A depicts an example configuration 200 of an IDCS 76 according to various embodiments. As depicted, ICDS 76 includes a set of one or more atomic sections 202 (depicted as atomic sections 202(*a*), 202(*b*), . . .). Each atomic section 202 includes a plurality of component operations 74. As depicted, atomic section 202(*a*) includes component operations 74(A), 74(B), . . . , while atomic section 202(*b*) includes component operations 74(A'), 74(B'), . . . .

Each operation 74 includes an operation type 203, a destination volume identifier 204, a destination address 206, and a length 208. Depending on the type of the respective operation 74, some operations 74 may also include a source volume identifier 210, a source address 212, a source buffer pointer 213, and/or a scatter-gather list 214.

Operation type 203 identifies a particular type for the operation 74. Options may include, for example:

A "buffered write," which copies from a source buffer located at an address of memory 50 identified by source buffer pointer 213. A number of bytes identified by length 208 is copied from the source buffer to the destination address 206 on the volume 51 identified by the destination volume identifier 204.

A "Data-Copy-Avoidance write," which copies from addresses on disk or in memory 50 identified by scatter-gather list 214. Scatter-gather list includes a set of source addresses 212 (and source volume identifiers 210) or source buffer pointers 213, each with an associated length. MCD 58(a) copies from the locations collected from the scatter-gather list 214 to the destination address 206 on the volume 51 identified by the destination volume identifier 204.

A "zero," which fills a number of bytes identified by length 208 at destination address 206 on the volume 51 identified by the destination volume identifier 204 with zeroes.

A "discard," which invalidates a number of bytes identified by length 208 at destination address 206 on the volume 51 identified by the destination volume identifier 204. This region will be considered invalid (so reads from the region are not allowed) until it is written to at a later time.

A "copy," which copies a number of bytes identified by length 208 from a source address 212 on a volume 51 identified by the source volume identifier 210 to the destination address 206 on the volume 51 identified by the destination volume identifier 204.

A "rename," which moves a number of bytes identified by length 208 from a source address 212 on a volume 51 identified by the source volume identifier 210 to the destination address 206 on the volume 51 identified by the destination volume identifier 204. Unlike a copy operation which actually copies data, a rename operation reassigns pointers so that the underlying data is logically moved from one location to the other.

The operations 74 within any given atomic section 202 are guaranteed to be performed atomically. Each successive atomic section 202 is atomically executed upon successful completion of the previous atomic section 202 of the IDCS 76. In some embodiments, a maximum number of operations 74 (e.g., 128 operations 74) is permitted within any given atomic section 202.

Figure 3B:
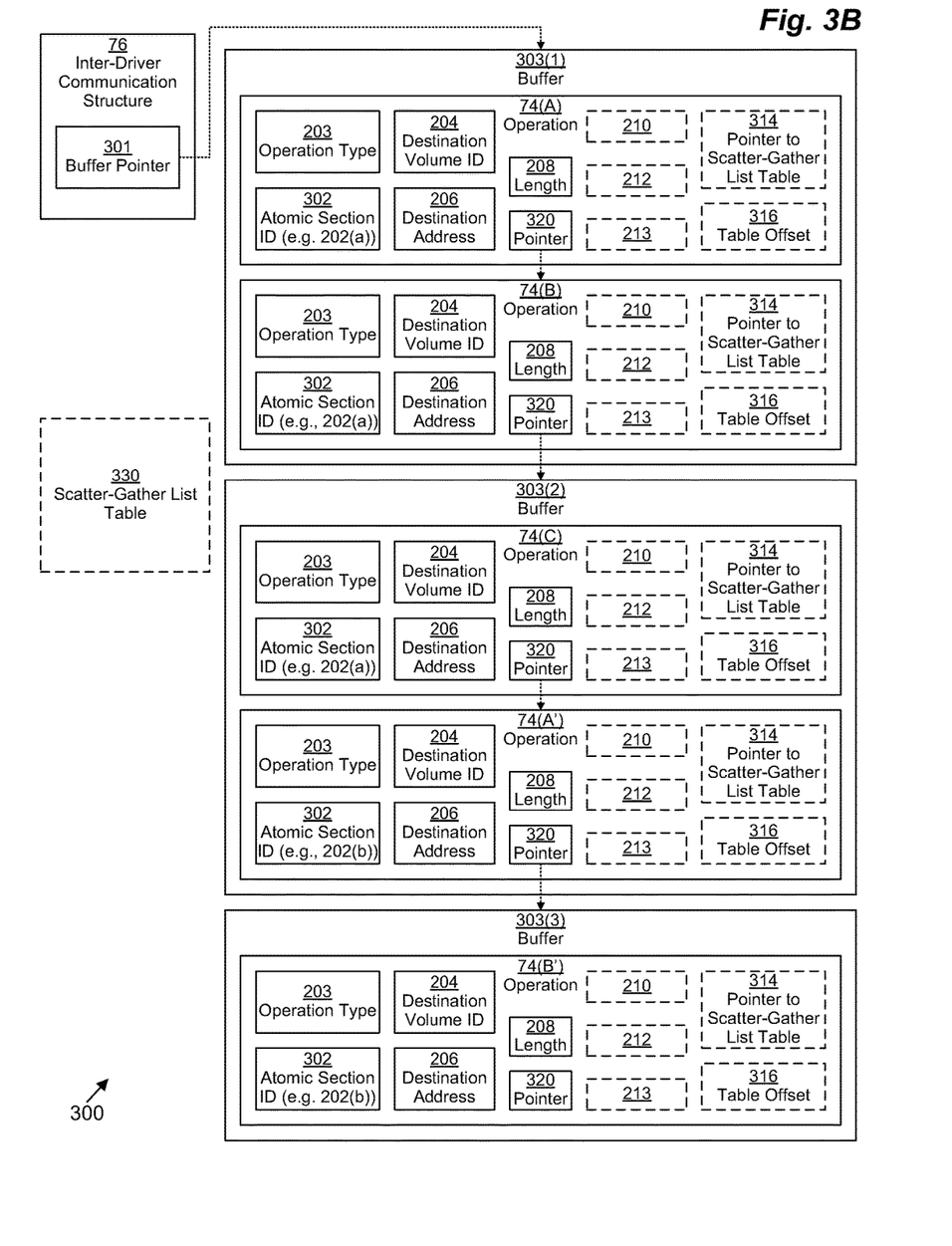

FIG. 3B depicts another example configuration 300 of an IDCS 76 according to various alternate embodiments. As depicted, ICDS 76 includes a buffer pointer 301, which points to a buffer 303(1) within memory 50. Buffer 303(1) includes a set of operations 74. Each operation 74 includes an operation type 203, a destination volume identifier 204, a destination address 206, a length 208, an atomic section identifier 302, and a pointer 320 to a next operation 74. Depending on the type of the respective operation 74, some operations 74 may also include a source volume identifier 210, a source address 212, a source buffer pointer 213, a scatter-gather list table pointer 314, and/or a table offset 316.

The use of a buffer pointer 301 and pointers 320 allows the IDCS 76 to effectively include an arbitrary number of operations 74 even though the size of the IDCS 74 is small and fixed. Thus, each operation 74 points to the next. It should be noted that although buffer 303(1) has a fixed size, an arbitrary number of operations 74 may still be chained together because the pointer 320 may point to a location in a different buffer 303. Thus, as depicted, each buffer 303 can fit two operations 74, and a total of five operations 74(A), 74(B), 74(C), 74(A'), 74(B') are chained together. As depicted, operations 74(A), 74(B), 74(C) are part of a first atomic section 202(a), each having an atomic section identifier 302 identifying that first atomic section 202(a). As further depicted, operations 74(A'), 74(B') are part of a second atomic section 202(b), each having an atomic section identifier 302 identifying that second atomic section 202(b).

The operation types are the same as in the configuration 200 of FIG. 3A. However, a "Data-Copy-Avoidance write" operates slightly differently. Instead of using a scatter-gather list 214 for each operation 74, a single scatter-gather list table 330 is used. Each scatter-gather list table 330 includes a set of paired locations (volume identification and byte offset within that volume) and lengths. The pointer 314 for any given operation 74 may point to the scatter-gather list table 330. The table offset 316 points to a starting location within that table 330 at which the operation 74 begins, copying a number of bytes collected from the table 330 identified by the length 208. Each successive Data-Copy-Avoidance write operation 74 within an atomic section 202 should have a higher table offset 316 than the previous Data-Copy-Avoidance write operation 74 within that atomic section 202 as well as higher than from any preceding atomic section 202. In some embodiments, instead of each operation 74 having a "Data-Copy-Avoidance" operation type 203 separately including the pointer 314 to the scatter-gather list table 330, the pointer 314 may only be included once per set of operations 74 from that IDCS 76, or it may be included within the IDSC 76 itself.

Figure 4:
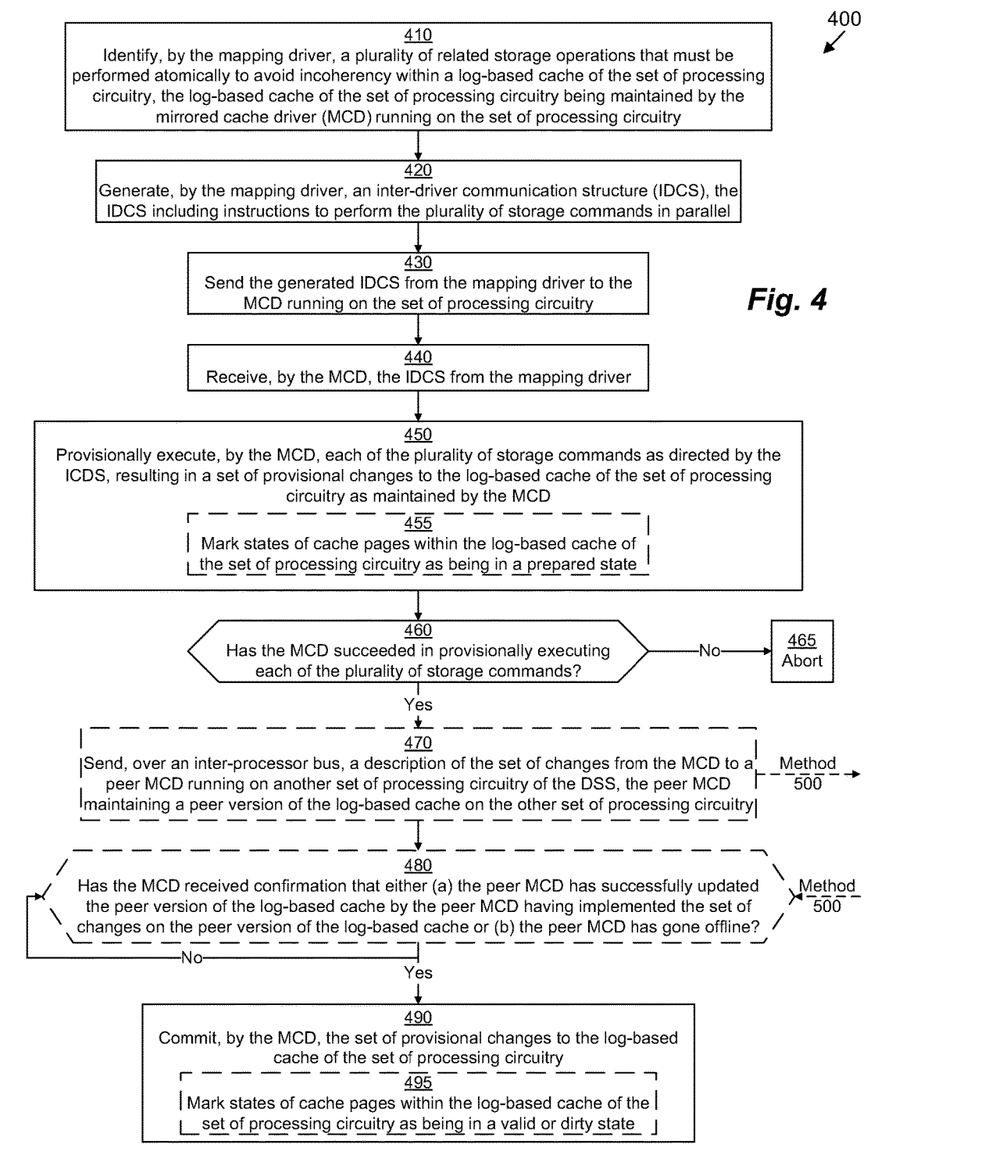
FIG. 4 is a flowchart depicting example methods according to various embodiments.

FIG. 4 depicts an example method 400 of maintaining cache coherence in a consistent state. Method 400 is performed by a first SP 34(a) of a DSS 32. It should be understood that any time a piece of software (e.g., mapping driver 52, MCD 58(a), peer MCD 58(b), etc.) is described as performing a method, process, step, or function, in actuality what is meant is that a computing device (e.g., SP 34(a), 34(b), DSS 32, etc.) on which that piece of software is running performs the method, process, step, or function when executing that piece of software on its processing circuitry 36. It should be understood that, in some embodiments, one or more of the steps or sub-steps may be omitted. Similarly, in some embodiments, one or more steps or sub-steps may be combined together or performed in a different order.

Method 400 may be performed as the SPs 34(a), 34(b) continue to operate to perform I/O transactions, receiving storage commands and responding with storage responses.

In step 410, mapping driver 52 identifies a plurality of related storage operations 74 that must be performed atomically to avoid incoherency within a log-based cache 56 of the first SP 34(a), the log-based cache 56 of the set of processing circuitry being maintained by MCD 38(a) running on the first SP 34(a).

In step 420, in response to identifying the plurality of related data storage commands 74, mapping driver 52 generates an IDCS 76, the IDCS 76 including instructions to perform the plurality of storage commands 74 in parallel. This is done by placing all of the plurality of related storage commands 74 within the same atomic section 202(x). Mapping layer 52 may also place another set of related storage commands 74' in another atomic section 202(y) of the IDCS 76.

In step 430, mapping driver 52 sends the generated IDCS 76 to the MCD 58(a). In step 440, MCD 58(a) receives the IDCS 76 from the mapping driver 52.

In step 450, MCD 58(a) provisionally executes each of the plurality of storage commands 74 in one atomic section 202 as directed by the ICDS 76, resulting in a set of provisional changes 78 to the log-based cache 56 as maintained by the MCD 58(a). It should be understood that the set of provisional changes 78 actually records these changes as they affect the log-based cache 56 as stored in the mirrored cache 60(a). In sub-step 455, MCD 58(a) does this provisional execution by marking states (not depicted) of cache pages 108 in the mirrored cache 60(a) that it modifies as being in a "prepared" state. Being in a prepared state indicates that a cache page 108 is not yet committed, but that it is scheduled to become committed once mirroring has completed successfully. In the meantime, if SP 34(a) attempts to read or write to any of the cache pages 108 that have been marked as prepared, such access will fail. Instead, SP 34(a) may attempt to read the corresponding cache pages 108 as stored within the peer mirrored cache 60(b) on the peer SP 34(b).

In step 460, MCD 58(a) ascertains whether it has successfully provisionally executed all of the plurality of storage commands 74 in the atomic section 202. If any of these related storage commands 74 cannot execute correctly, then execution of the entire atomic section 202 is aborted (step 465). In that event, the provisional changes 78 that have already been made are reversed. However, in some embodiments, execution of previous atomic sections 202 within the IDCS 76 which have already completed will not be affected by this abort.

If MCD 58(a) ascertains that it has indeed successfully provisionally executed all of the plurality of storage commands 74 in the atomic section 202, then operation proceeds either to optional step 470 (in embodiments in which the mirrored cache 60(a) is being actively mirrored on peer SP 34(b)) or to step 490 (in other embodiments, e.g., if the peer SP 34(b) is offline or malfunctioning).

In step 470, MCD 58(a) sends the provisional changes 78 over inter-processor bus 59 from the MCD 58(a) to the peer MCD 58(b) running on peer SP 34(b) of the DSS 32, the peer MCD 58(b) maintaining peer mirrored cache 60(b).

Figure 5:
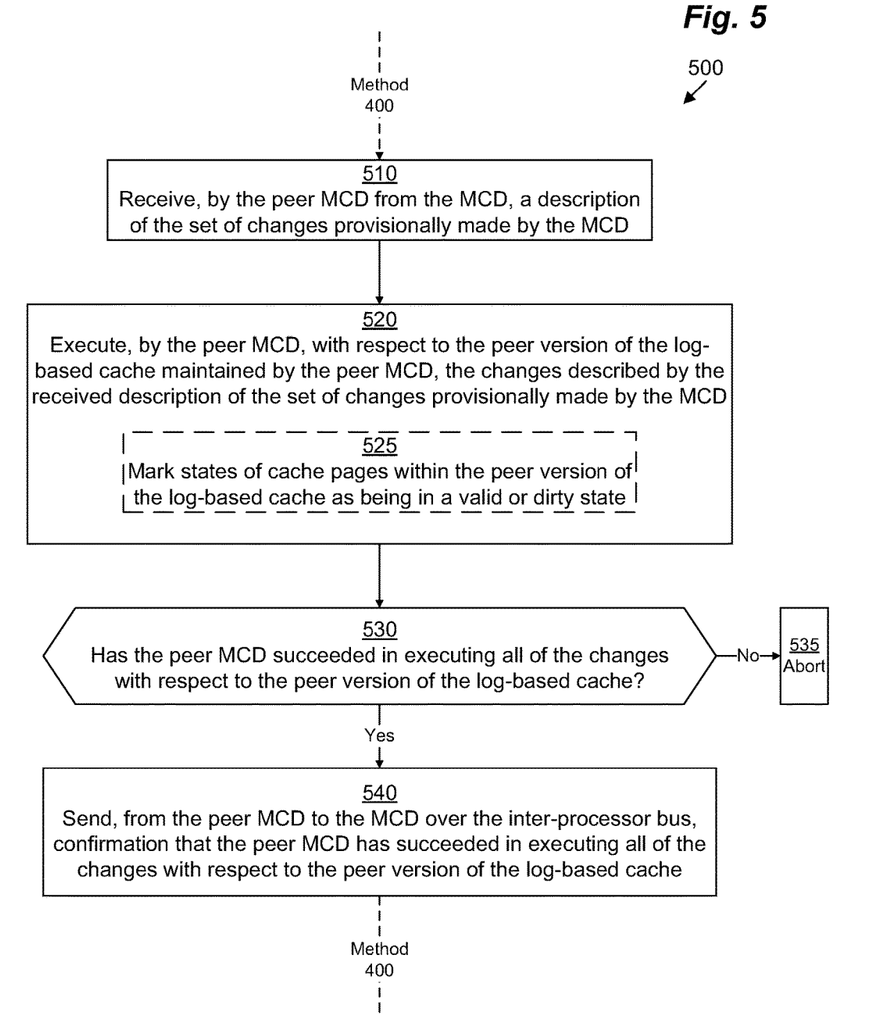
FIG. 5 is a flowchart depicting example methods according to various embodiments.

At this point, peer MCD 58(b) executes method 500, depicted in FIG. 5.

In step 510, peer MCD 58(b) receives the provisional changes 78 made by the MCD 58(a) over inter-processor bus 59 from the MCD 58(a).

In step 520, peer MCD 58(b) executes the provisional changes 78 with respect to the peer mirrored cache 60(b). In sub-step 525, this execution includes marking states (not depicted) of cache pages 108 in the peer mirrored cache 60(b) that it modifies as being in a "dirty" state (or, in some embodiments, in a "valid" state). Being in the dirty state indicates that the changes are fully committed within the peer mirrored cache 60(b), although they have not yet been flushed to persistent storage 46. If the cache pages 108 are marked valid, then that means that the changes are fully committed within the peer mirrored cache 60(b) and they have already been flushed to persistent storage 46.

In step 530, peer MCD 58(b) ascertains whether it has successfully executed all of provisional changes 78. If any of these provisional changes 78 cannot execute correctly, then execution is aborted (step 535). In that event, the provisional changes 78 that have already been made are reversed.

If peer MCD 58(b) ascertains that it has indeed successfully executed all of provisional changes 78, then operation proceeds to step 540.

In step 540, peer MCD 58(b) sends a confirmation signal 80 to MCD 58(a) over inter-processor bus 59.

Returning to FIG. 4, in step 480, MCD 58(a) ascertains whether either (a) the confirmation signal 80 has been received from peer MCD 58(b) or (b) it can determine that the peer SP 34(b) has malfunctioned or gone off-line. In some embodiments, this latter determination may be made upon failing to receive a periodic heartbeat signal from the peer SP 34(b) within a timeout period (e.g., every 1 minute). In some embodiments, this determination may be made in response to receiving a signal from the other SP 34(b) indicating that it is about to go off-line or a signal from an administrator informing it that the other SP 34(b) has failed. If neither (a) nor (b) can be ascertained, then MCD 58(a) may wait and repeat step 480 periodically until an affirmative result is reached.

Once step 480 produces an affirmative result, then operation proceeds with step 490. This means that either the peer MCD 58(b) has mirrored the changes 78 correctly or peer SP 34(b) has gone offline. Either way, the provisional changes 78 should now be made permanent. Thus, in step 490, MCD 58(a) commits the changes 78 that it had made in step 450. In sub-step 495, this commitment includes marking states (not depicted) of cache pages 108 in the mirrored cache 60(a) that had been marked as "prepared" in sub-step 455 to now be in the "dirty" state (or, in some embodiments, in the "valid" state). Being in the dirty state indicates that the changes are fully committed within the mirrored cache 60(a), although they have not yet been flushed to persistent storage 46. If the cache pages 108 are marked valid, then that means that the changes are fully committed within the mirrored cache 60(a) and they have already been flushed to persistent storage 46.

At this point, MCD may send an acknowledgment signal 82 back to the mapping driver 52.

Conclusion

Thus, improved techniques for maintaining cache coherence in a consistent state are provided. These techniques implement a DSS 32 using a journaled mirrored cache (i.e., data log 56 as stored within mirrored cache 60(a)) that ensures that related storage operations 74 making up certain complex transactions 72 be performed atomically, so that a system failure does not result in data loss. The improved techniques also allow for efficient communication of mirroring information. This efficiency is because changes 78 are sent across inter-processor bus 59 all at once without needing to send change information separately for each operation 74 across the inter-processor bus 59.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed.

Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method, performed by a data storage system (DSS), of maintaining cache coherence in a consistent state, the method comprising:
by a mapping driver running on a set of processing circuitry of the DSS, identifying a plurality of related storage operations that must be performed atomically to avoid incoherency within a log-based cache of the set of processing circuitry, the log-based cache of the set of processing circuitry being maintained by a mirrored cache driver (MCD) running on the set of processing circuitry;
in response to identifying the plurality of related data storage commands, generating, by the mapping driver, an inter-driver communication structure (IDCS), the IDCS including instructions to perform the plurality of storage commands in parallel;
sending the generated IDCS from the mapping driver to the MCD running on the set of processing circuitry;
in response to the MCD receiving the IDCS from the mapping driver, provisionally executing, by the MCD, each of the plurality of storage commands as directed by the ICDS, resulting in a set of provisional changes to the log-based cache of the set of processing circuitry as maintained by the MCD; and
in response to successfully completing provisionally executing all of the plurality of storage commands, committing, by the MCD, the set of provisional changes to the log- based cache of the set of processing circuitry.

2. The method of claim 1,
wherein the method further comprises, in response to successfully completing provisionally executing all of the plurality of storage commands and prior to committing the set of provisional changes, sending, over an inter-processor bus, a description of the set of changes from the MCD to a peer MCD running on another set of processing circuitry of the DSS, the peer MCD maintaining a peer version of the log-based cache on the other set of processing circuitry; and
wherein committing the set of provisional changes to the log-based cache of the set of processing circuitry is further performed in response to receiving, by the MCD, confirmation that one of (a) the peer MCD has successfully updated the peer version of the log-based cache by the peer MCD having implemented the set of changes on the peer version of the log-based cache and (b) the peer MCD has gone offline.

3. The method of claim 2 wherein:
provisionally executing each of the plurality of storage commands as directed by the ICDS includes marking, by the MCD, a cache page within the log-based cache of the set of processing circuitry as being in a prepared state; and
committing the set of provisional changes to the log-based cache of the set of processing circuitry includes marking, by the MCD, the cache page within the log-based cache of the set of processing circuitry as being in one of a valid state and a dirty state.

4. The method of claim 3 wherein the peer MCD is configured to, while implementing the set of changes on the peer version of the log-based cache, mark another cache page within the peer version of the log-based cache as being in one of the valid state and the dirty state.

5. The method of claim 1 wherein the plurality of related storage operations that must be performed atomically to avoid incoherency within the log-based cache include:
a write command directed to a block of the log-based cache, the block of the log-based cache being backed by a cache page maintained by the MCD, the write command including data received from a remote host device performing a write to a destination address on the logical disk of the DSS; and
a copy command directed to a datalog descriptor of the log-based cache, the datalog descriptor of the log-based cache being backed by another cache page maintained by the MCD, the datalog descriptor indicating the destination address and indicating a location of the cache page.

6. The method of claim 1 wherein the plurality of related storage operations that must be performed atomically to avoid incoherency within the log-based cache include:
a cache rename command to cause a cache page maintained by the MCD that was backing a block of the log-based cache to instead back a block on a logical disk of the DSS; and
an invalidation command to cause a datalog descriptor of the log-based cache to become invalidated, the datalog descriptor pointing to the block of the log-based cache that was backed by the cache page maintained by the MCD.

7. The method of claim 1 wherein the IDCS includes an atomic section, the atomic section including the plurality of storage commands.

8. The method of claim 7 wherein the atomic section is configured to store up to 128 storage commands.

9. The method of claim 7 wherein the IDCS further includes another atomic section, the other atomic section including another plurality of storage commands that must be performed atomically by the MCD.

10. The method of claim 1 wherein the IDCS includes a reference to a set of buffers containing the plurality of storage commands, the plurality of storage commands making up an atomic section.

11. The method of claim 10 wherein the atomic section is configured to include up to 128 storage commands.

12. The method of claim 10 wherein the set of buffers further includes another atomic section, the other atomic section including another plurality of storage commands that must be performed atomically by the MCD.

13. A data storage system (DSS) apparatus comprising:
a set of persistent storage devices;
a set of processing circuitry including processors coupled to memory, the processing circuitry being configured to:
by a mapping driver running on the set of processing circuitry, identify a plurality of related storage operations that must be performed atomically to avoid incoherency within a log-based cache of the set of processing circuitry, the log-based cache of the set of processing circuitry being maintained by a mirrored cache driver (MCD) running on the set of processing circuitry, the plurality of related storage operations being directed to storage constructs backed by the set of persistent storage devices;

in response to identifying the plurality of related data storage commands, generate, by the mapping driver, an inter-driver communication structure (IDCS), the IDCS including instructions to perform the plurality of storage commands in parallel;

send the generated IDCS from the mapping driver to the MCD running on the set of processing circuitry;

in response to the MCD receiving the IDCS from the mapping driver, provisionally execute, by the MCD, each of the plurality of storage commands as directed by the ICDS, resulting in a set of provisional changes to the log-based cache of the set of processing circuitry as maintained by the MCD; and in response to successfully completing provisionally executing all of the plurality of storage commands, commit, by the MCD, the set of provisional changes to the log-based cache of the set of processing circuitry.

14. A computer program product comprising a non-transitory computer-readable storage medium storing a set of instructions, which, when executed by a data storage system device, cause the DSS device to:

execute a mapping driver on a set of processing circuitry of the DSS device in order to:

identify a plurality of related storage operations that must be performed atomically to avoid incoherency within a log-based cache of the set of processing circuitry, the log-based cache of the set of processing circuitry being maintained by a mirrored cache driver (MCD) running on the set of processing circuitry;

in response to identifying the plurality of related data storage commands, generate an inter-driver communication structure (IDCS), the IDCS including instructions to perform the plurality of storage commands in parallel; and send the generated IDCS from the mapping driver to the MCD; and execute the MCD on the set of processing circuitry of the DSS device in order to:

in response to the MCD receiving the IDCS from the mapping driver, provisionally execute each of the plurality of storage commands as directed by the ICDS, resulting in a set of provisional changes to the log-based cache of the set of processing circuitry as maintained by the MCD; and in response to successfully completing provisionally executing all of the plurality of storage commands, commit the set of provisional changes to the log-based cache of the set of processing circuitry.

* * * * *